May 11, 1965
C. L. WEIMER ETAL
3,183,298
BUS BAR CONNECTING MEANS
Filed Feb. 11, 1960
3 Sheets-Sheet 1
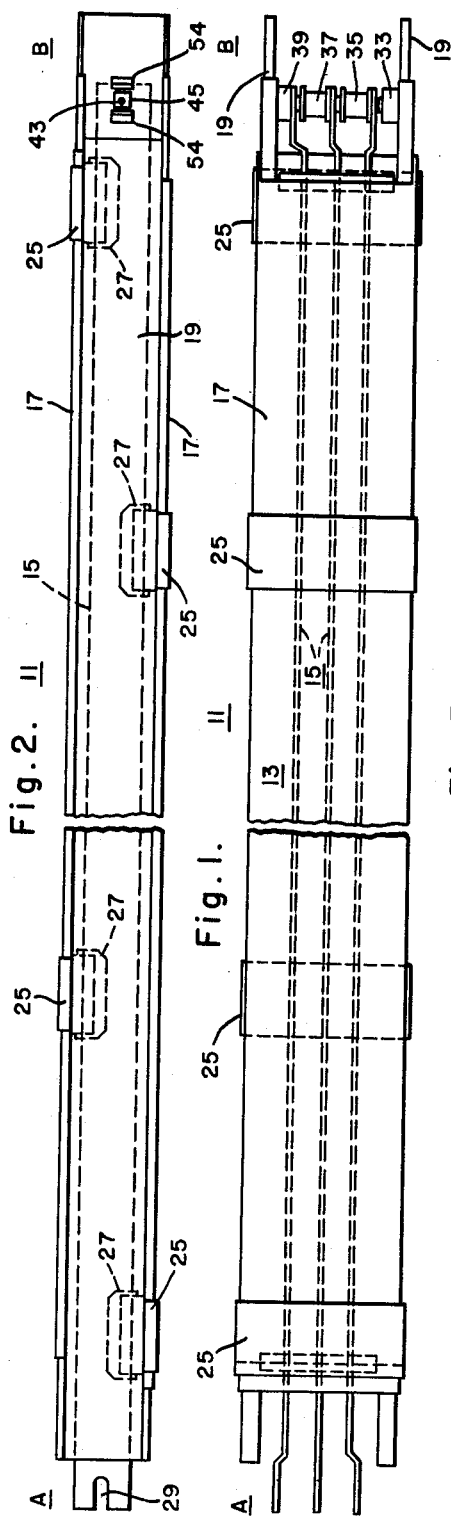
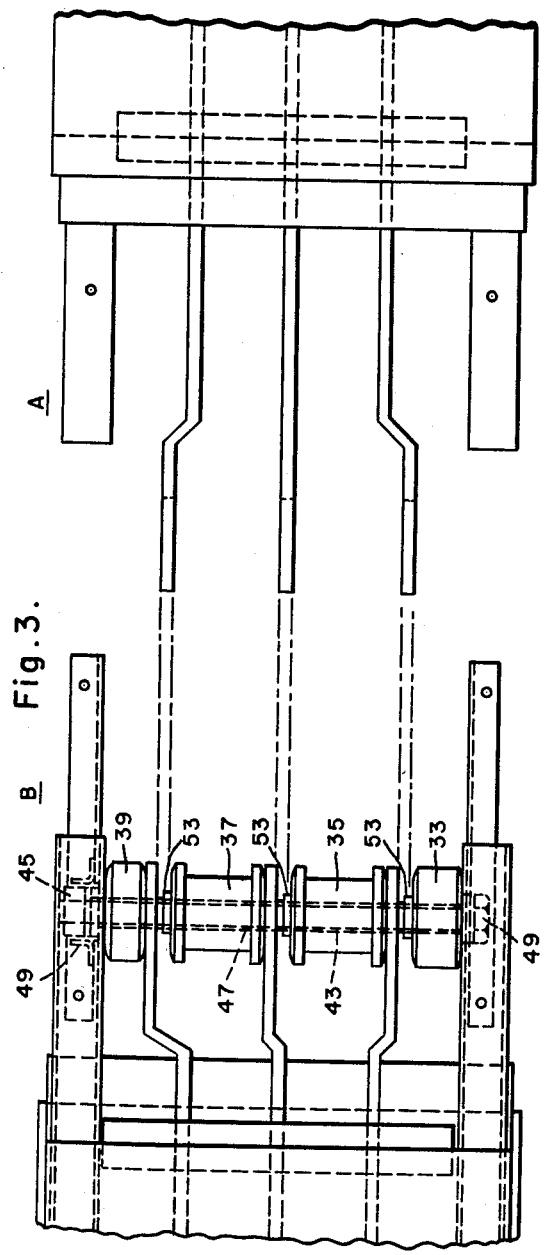
INVENTORS
Chales L. Weimer and
Rex S. Garret.
BY
ATTORNEY United States Patent Office
3,183,298
Patented May 11, 1965

3,183,298
BUS BAR CONNECTING MEANS
Charles L. Weimer, Patterson Heights, and Rex S. Garrett, Brighton Township, Beaver County, Pa., assignors to Westinghouse Electric Corporation, East Pittsburgh, Pa., a corporation of Pennsylvania
Filed Feb. 11, 1960, Ser. No. 8,151
3 Claims. (Cl. 174—88)

This invention relates to a bus duct system of electrical power distribution, and more particularly to means for connecting the bus bars of two sections of bus duct.

An object of the invention is to provide improved means for connecting the bus bars of two sections of bus duct.

Another object of the invention is to provide improved means for supporting connected bus bars at the connection.

A further object of the invention is to provide bus duct that requires less time and effort to install at the job site.

Other objects of the invention will be explained fully hereinafter or will be apparent to those skilled in the art.

In accordance with one embodiment of the invention, the bus bars of two sections of bus duct are connected together with only one bolt. The bolt, with an insulating tube over it, extends through an opening in each of the bus bars of one section of duct. An end of each of the bus bars of a second section of duct is bifurcated to straddle the bolt and tube. Insulating members are provided to space the connected bus bars, and a sleeve portion of each of the outermost members extends through an opening in the duct housing so that the connection can be tightened from outside of the housing by tightening the bolt which also extends through the opening in the housing.

For a better understanding of the nature and objects of the invention, reference may be had to the following detailed description, taken in conjunction with the accompanying drawings, in which:

FIGURE 1 is an elevational view of a section of bus duct;

FIG. 2 is a top view of the section of bus duct illustrated in FIG. 1;

FIG. 3 is an elevational view, on an enlarged scale, of one end each of two sections of bus duct prior to their connection;

Figure 4:
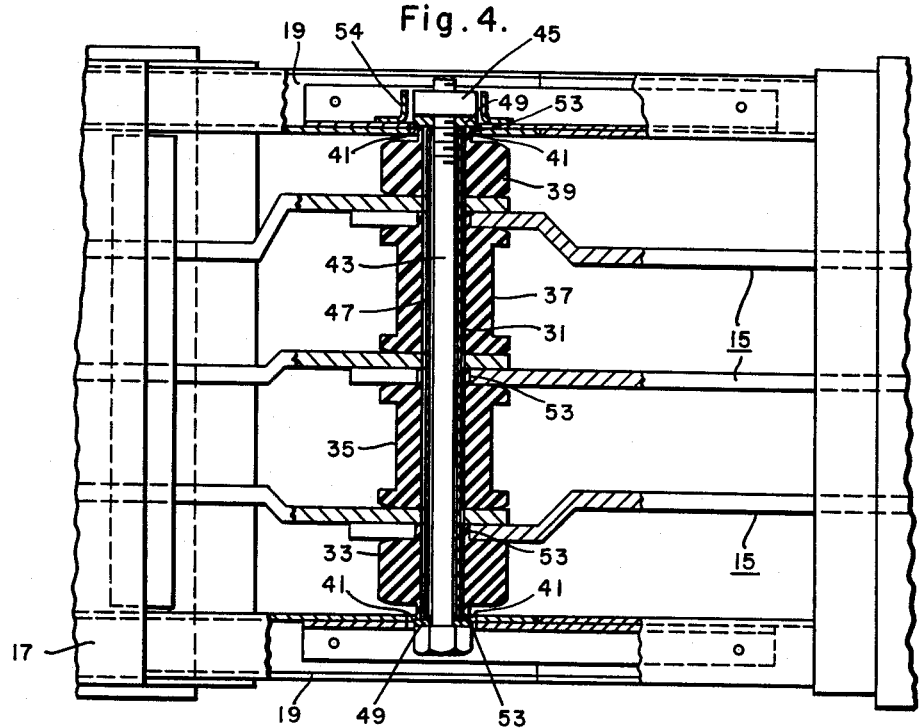
FIG. 4 is an enlarged view, partly in elevation, and partly in section, of the connection of the two sections of bus duct shown in FIG. 3.

Referring to the drawings, and particularly to FIGS. 1 and 2, a section of bus duct indicated generally at 11 comprises a housing indicated generally at 13 and three bus bars indicated generally at 15 supported within the housing. The bus duct housing 13 is of the four-channel interlocking type of construction including two channel-shaped parallel side members 17 that are interlocked with two other channel-shaped parallel members 19.

The section of bus duct 11 is of the type known generally in the art as plug-in bus duct. The side members 17 are provided with longitudinally spaced openings staggered lengthwise on opposite sides of the bus duct to provide access to the bus bars for the contact elements of plug-in units (not shown). As shown in FIGS. 1 and 2, these openings are covered, when not in use, by sliding cover plates 25 that interlock with the housing members 17. An insulating support member 27 (FIG. 2) is provided at each of these openings to support the bus bars within the housing and to insulate the plug-in unit contact elements from each other. The inter-locking housing 13 and the plug-in units may be of the type specifically described in the patent to W. F. Born et al., Patent No. 2,725,541, issued November 29, 1955, and assigned to the assignee of the instant invention.

As illustrated in FIG. 2, each of the bus bars 15 is bifurcated at one end forming a slot 29. This end is designated in the drawings with the reference character A. An opening 31 (FIG. 4) is provided at the other or B end of each of the bus bars 15. The opening 31 also extends through each of four tubular insulating, spacing and supporting members 33, 35, 37 and 39. As seen in FIGS. 2 and 4, the opening 31 is in alinement with a larger opening 41 in each of the housing members 19.

Figure 6:
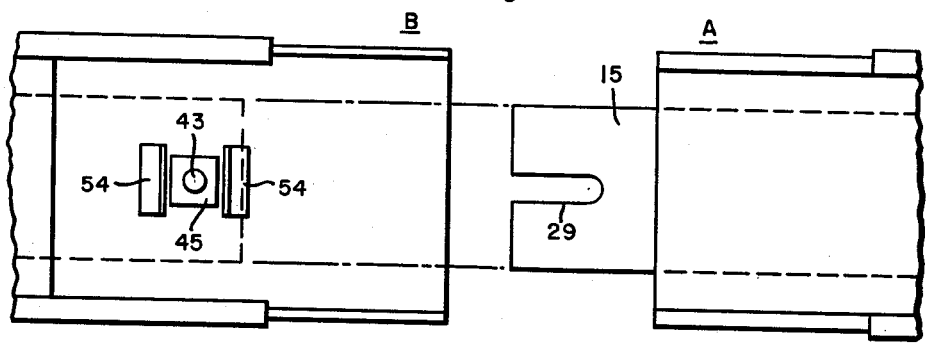
FIG. 6 is a top view of the ends of the two sections of bus duct shown in FIG. 3.

In addition to the four insulating spacing and supporting members 33, 35, 37 and 39, a single bolt 43 (FIGS. 3 and 4) and nut 45, and an insulating tube 47 are used to effect a connection between two sections of bus duct. Each of the two sections, which are partially shown in FIGS. 3, 4 and 6, is identical in construction to the section 11 illustrated in FIGS. 1 and 2. For this reason, the reference character for the two sections partially illustrated in FIGS. 3 and 4 are identical to the reference characters used for the one section shown in FIGS. 1 and 2. As shown in FIGS. 3, 4 and 6, when two sections of bus duct are connected, the A end of one section is mated with the B end of another section. The ends of the bus bars 15 are off-set so that they overlap (FIG. 4) when connected.

The connecting ends A and B of two sections of bus duct are shown in FIGS. 3 and 6 prior to their connection. The bolt 43 and insulating tube 47 extend through the openings 41 in the housing members 19, and through the openings 31 in the bus bars 15 and supporting members 33, 35, 37 and 39. A washer 49 is provided at each end of the bolt 43 and the nut 45 is threaded loosely over one end of the bolt. Each of the tubular supporting members 35, 37 and 39 has an upper tubular sleeve portion 53 (FIG. 4) molded integral therewith. The lowermost tubular supporting member 33 has both an upper and a lower tubular sleeve portion 53 molded integral therewith. The two outermost sleeve portions 53, of the supporting members 33 and 39, extend through the openings 41 in the housing members 19 so that the connection (FIG. 4) can be tightened from outside of the housing. As best illustrated in FIG. 3, the three other sleeve portions 53 on the supporting members 33, 35 and 37 provide spacing so that the slotted bus bars 15 of the A end of the one section can be moved into position for the connection (FIG. 4). The bus bars 15 are thicker than the height of the sleeve portions 53, so that pressure can be applied to the bus bars when the connection is tightened. The sleeve portions 53 on all of the supporting members also serve to provide electrical clearance between bus bars along the surface of the insulating tube 47 which is over the bolt 43.

Referring to FIGS. 3 and 6, it can be understood that the two sections can be connected together by moving the A end of one of the sections to the left so that the slots 29 receive the upper sleeve portions 53 of the supporting members 33, 35 and 37. The overlapping bus bars 15 (FIG. 4) are then physically and electrically connected together by tightening the one bolt and nut connection 43, 45. Two angle members 54 are attached to the upper housing member 19 on opposite sides of the opening 41 through which the bolt 43 extends. These angle members are provided to engage the corners of the square nut 45 to prevent the nut from turning, so that the connection can be tightened from one side only of the bus duct. As viewed in FIG. 4, the housing members 17 and 19 of the two sections interlock to enclose the bus bar connection in a manner well known in the art.

Figure 5:
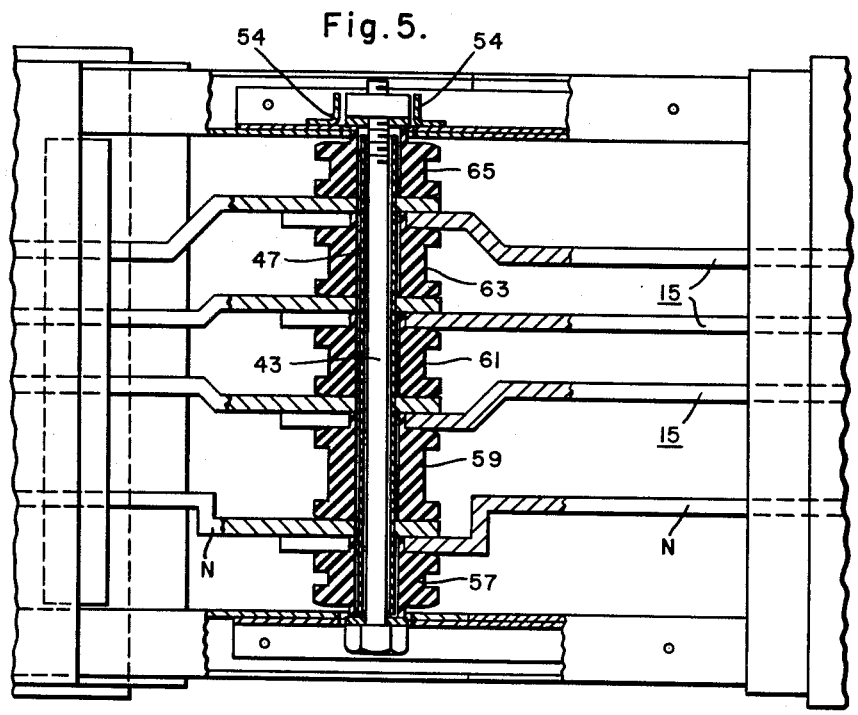
FIG. 5 is a view, similar to FIG. 4, illustrating the connection of two sections of bus duct having neutral bus bars.

The connection illustrated in FIG. 4 is the type that would be used in a three-phase, three wire system of bus duct. A connection of a similar type that would be used in a three-phase, four wire system is illustrated in FIG. 5. In FIG. 5, there is an additional bus bar N, which is a neutral bus bar, in each section. It should also be noted that there are five, rather than four, tubular insulating spacing and supporting members 57, 59, 61, 63 and 65 in FIG. 5 to provide the additional spacing and support needed for this connection. Otherwise, similar parts are designated by like reference characters, and the description of the connection shown in FIG. 4 can be applied generally to the connection shown in FIG. 5.

From the foregoing description, it is apparent that we have provided improved means, using only one bolt, for connecting sections of bus duct. The sections can be connected faster and easier than in the past because the connection requires the tightening of only one nut and bolt combination. Moreover, this nut and bolt combination can be tightened from outside of the bus duct housing, and the tightness of the connection can be checked periodically without requiring access to the interior of the housing. Another advantage of the connection is that pressure is applied to the bus bars independently of the housing. The connection, being unattached to the housing, "floats" therein, thereby relieving the housing from unnecessary stresses. A further advantage of our improved connection is the additional strength and support at the connection achieved by the use of the insulating spacing and support members.

Figure 7:
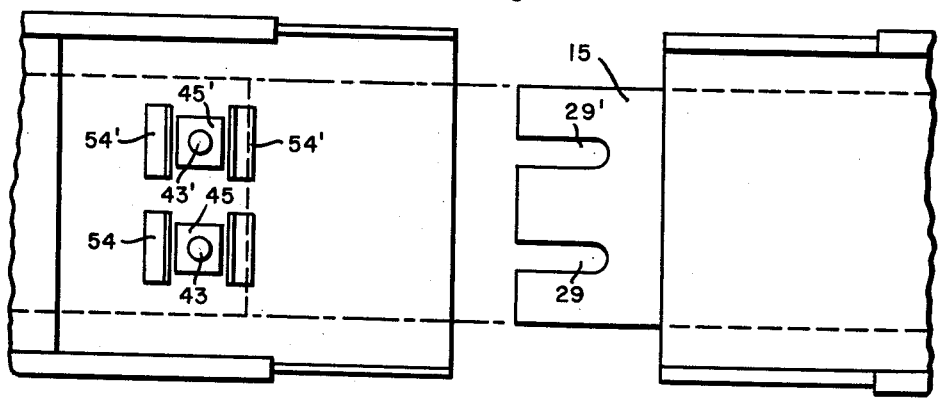
FIG. 7 is a top view, similar to FIG. 6, of a different embodiment of the invention.

For some systems of bus duct, especially those wherein relatively wide bus bars are used, it is desirable to use two fastening bolts across the width of the bus bars in order to connect two sections of duct. This embodiment of the invention is illustrated in FIG. 7, which is a plan view, similar to FIG. 6, of the ends of two sections of bus duct prior to their connection. Referring to FIG. 7, it can be understood that two slots 29 and 29', in each of the bus bars 15, receive two bolts 43 and 43' which are threaded into two nuts 45 and 45' that are prevented from turning by two sets of angle members 54 and 54'. Otherwise, similar parts are indicated by reference characters which are like those used in FIGS. 1–5, and the two parts shown in FIG. 7 would be connected in essentially the same manner as the connections illustrated in FIG. 4. It can be understood that this embodiment has all of the advantages of the previously described embodiments except that, in this embodiment, two fastening bolts are used across the width of the bus bars in order to connect two sections of bus duct.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In combination, two elongated sets of bus bars, each of said sets comprising at least two bus bars, connecting means comprising a first connecting member and a second connecting member cooperating with said first connecting member to connect said two sets of bus bars together in a longitudinal relationship with each of the two bus bars of one of said sets overlapping a different one of the two bus bars of the other of said sets, each of the two bus bars of said one set having an opening therein, an insulating spacing member having an opening therein in line with said bus bar openings, said first connecting member extending through said openings in said bus bars and through said opening in said insulating spacing member, said insulating spacing member comprising a first part and a second part, said first part engaging a bus bar at each of its two opposite ends to space two overlapped bus bars from two other overlapped bus bars, each of the two bus bars of said other set being bifurcated at the overlapped end thereof and straddling said first connecting member, said second part of said insulating spacing member being straddled by the bifurcated end of a first of said bus bars, said first bus bar being in overlapping relationship with a second bus bar, said connecting means being operable to permit separation of said two sets of bus bars, said two sets of bus bars being separable by means of a longitudinal movement of either one of said sets, when separated said second part of said insulating spacing member spacing said second bus bar from said first part of said insulating spacing member, and the dimension of said second part of said insulating spacing member in the direction of said spacing being less than the thickness of said overlapped first and second bus bars.

2. In combination, two elongated sets of bus bars, each of said sets comprising a plurality of generally flat elongated bus bars, means supporting the bus bars in each of said sets in a generally parallel face-to-face relationship, connecting means comprising a first connecting member and a second connecting member, said connecting means connecting said two sets of bus bars together in a longitudinal relationship with each of the bus bars of one of said sets overlapping a different one of the bus bars of the other of said sets, each of the bus bars of said one set having an opening therein, an insulating spacing member having an opening therein in line with said bus bar openings, said first connecting member extending through said openings in said bus bars and through said opening in said insulating spacing member, said insulating spacing member comprising a first part and a second part, said first part engaging two bus bars to space two overlapped bus bars from two other overlapped bus bars, each of the bus bars of said other set being bifurcated at the overlapped end thereof and straddling said first connecting member, said second part of said insulating spacing member being straddled by the bifurcated end of a first of said bus bars, said first bus bar being in overlapping relationship with a second of said bus bars, said second connecting member cooperating with said first connecting member to exert pressure providing frictional engagement between each two overlapped bus bars to thereby connect said two sets of bus bars, said connecting means being mannualy operable to release said pressure to permit separation of said sets of bus bars, said sets of bus bars being separable by means of a longitudinal movement of either one of said sets, when said sets of bus bars are separated said second part of said insulating spacing member spacing said second bus bar from said first part of said insulating spacing member, and the spacing dimension of said second part of said insulating spacing member being less than the thickness of said first bus bar at said bifurcated end of said first bus bar.

3. In combination, two elongated sets of bus bars, each of said sets comprising a plurality of generally flat elongated bus bars and means supporting said bus bars in a generally parallel face-to-face relationship, connecting means comprising a connecting bolt and a connector member cooperable with said connecting bolt to connect said two sets of elongated bus bars together in a generally longitudinal relationship with each of the bus bars of one of said sets being in overlapping relationship with a different one of the bus bars of the other of said sets at said connection, each of the bus bars of said one set having an opening therein, a tubular insulating spacing member, said connecting bolt extending through said openings in said bus bars and through said tubular insulating spacing member, means insulating said connecting bolt from said bus bars, said tubular insulating spacing member comprising a tubular first part and a tubular second part, said tubular first part engaging two bus bars to space two overlapped bus bars from two other overlapped bus bars, each of the bus bars of said other set being bifurcated at the overlapped end thereof and straddling said connecting bolt, said tubular second part of said insulating spacing member being straddled by the bifurcated end of a first of said bus bars, said first bus bar being in an overlapping relationship with a second of said bus bars, said connector member cooperating with said connecting bolt to effect an exertion of pressure providing frictional engagement between each two overlapped bus bars to thereby connect said two sets of bus bars, said connecting means being operable to effect release of said pressure to enable said sets of bus bars to be separated, said sets of bus bars being separable by means of a generally longitudinal movement of either one of said sets, when said sets of bus bars are separated said tubular second part of said insulating spacing member spacing said second bus bar from said tubular first part of said insulating spacing member, and the axial spacing dimension of said tubular second part of said insulating spacing member being less than the thickness of said first bus bar at said bifurcated end of said first bus bar.

References Cited by the Examiner
UNITED STATES PATENTS

| | | | |
|---|---|---|---|
| 2,043,796 | 6/36 | Frank | 174—72 |
| 2,906,811 | 9/59 | Fisher | 174—88 |
| 2,932,686 | 4/60 | Herrmann | 174—88 |
| 3,031,521 | 4/62 | Krauss et al. | 174—88 |
| 3,104,276 | 9/63 | Cataldo et al. | 174—99 |

FOREIGN PATENTS 123,336  6/31  Austria.

JOHN F. BURNS, *Primary Examiner.*

E. JAMES SAX, JOHN P. WILDMAN, *Examiners.*